Feb. 22, 1938.  A. R. THOMPSON  2,108,951
CUTTING MACHINE
Filed Sept. 2, 1933   3 Sheets-Sheet 1

INVENTOR.
Albert. R. Thompson.
BY Philip A. Minnis
ATTORNEY

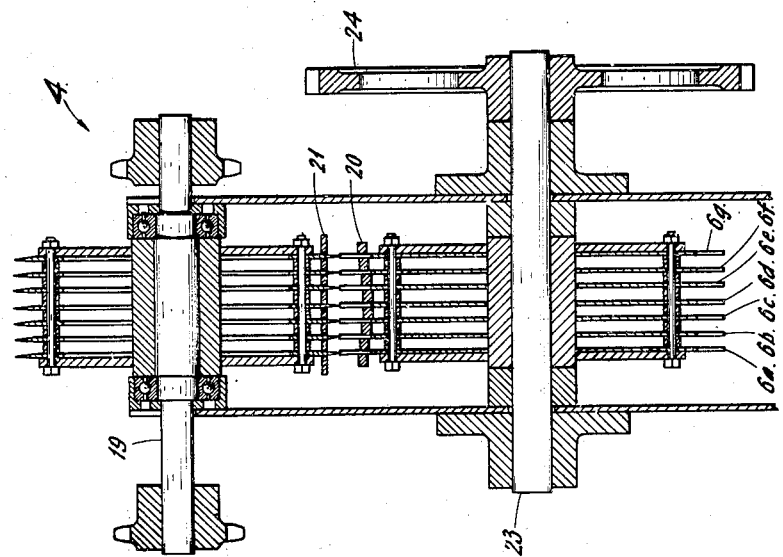
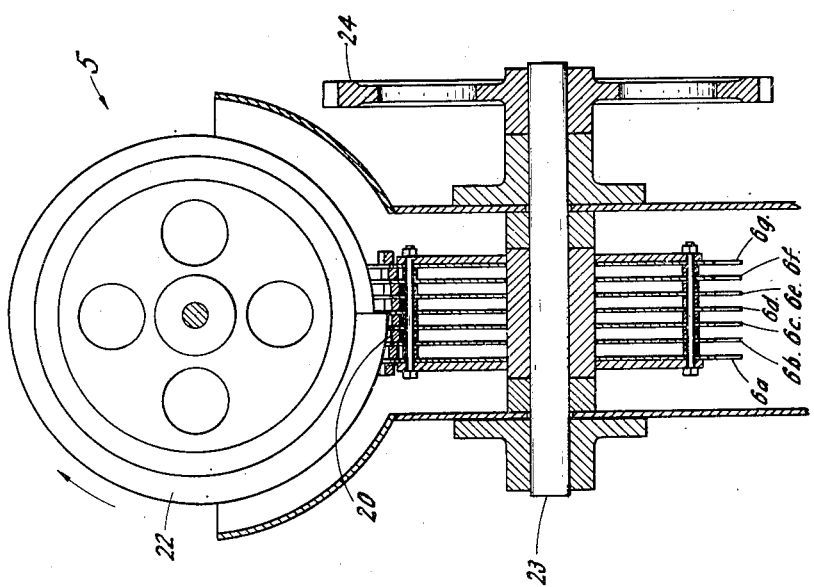

Patented Feb. 22, 1938

2,108,951

UNITED STATES PATENT OFFICE 2,108,951

CUTTING MACHINE

Albert R. Thompson, San Jose, Calif., assignor to Food Machinery Corporation, San Jose, Calif., a corporation of Delaware Application September 2, 1933, Serial No. 687,928

11 Claims. (Cl. 146—78)

This invention relates, in general, to cutting machines and has to do more particularly with machines for cutting materials (especially food materials) into pieces of more or less uniform size and configuration.

More specifically, the invention pertains to machines for dicing fruits and vegetables; that is to say, machines for cutting fruits and vegetables into rectangular or cubical pieces.

The subject matter of this invention is intended, more especially, for use in the canning industry; one of the underlying objects being to devise a machine of the character referred to which will operate successfully on tender fruit which is very susceptible of mutilation and particularly soft fruit such as apricots having skins of fibrous texture.

Another object is to provide a machine which will operate dependably and be capable of a large production capacity while at the same time being not inordinately expensive to build and not requiring an excessive amount of attention from the operator.

The invention entails a number of features which are believed to be unique and novel, both individually and in combination; but these distinctive features do not lend themselves very happily to exposition apart from the drawings and for that reason no attempt will be made to define the invention in this introductory part of the specification. It may, however, be worthy of observation and emphasis at this point that the invention is characterized in that the cutting of the fruit is accomplished by slicing or shearing operations as distinguished from chopping—mutilation of the fruit being thus obviated.

While the preferred embodiment of this invention which is to be described hereinafter was designed especially for dicing fruits and vegetables, it will be apparent to those skilled in the mechanical arts that certain of the novel constituent features and sub-combinations are well adapted to a considerable variety of uses.

The invention, as incorporated in a fruit and vegetable dicing machine, will now be described in detail with reference to the accompanying drawings, wherein:

Fig. 3 is a detail in cross-section taken along the line 3—3 of Fig. 1; and

Fig. 4 is a detail in cross-section taken along the line 4—4 of Fig. 1.

Figure 1:
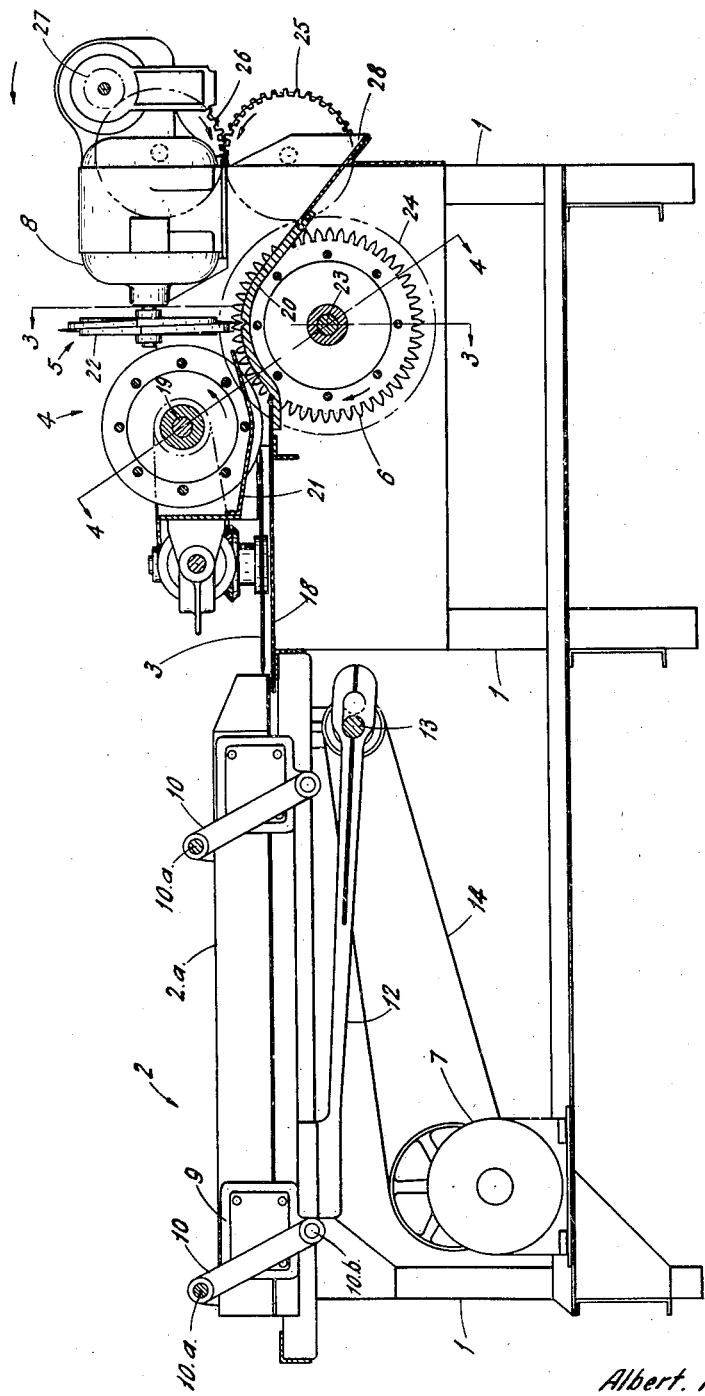
Fig. 1 is a longitudinal, vertical, sectional view of a dicing machine—covers and enclosures being omitted.

The machine illustrated was designed, more especially, for dicing halved fruit such as peaches, apricots and pears; the pits or cores having previously been removed.

The first function to be performed is that of turning the material in process (the halved fruit being operated upon) with its flat side down. The second function to be performed is that of slicing the material along a horizontal plane. The third function to be performed is that of cutting the previously sliced material into strips of uniform width. The fourth function is that of cutting the strips into sections of uniform length. Thus, the fruit or other material operated upon is cut into cubes or rectangles as nearly as may be possible, subject to the limitations imposed by the inherently non-rectangular configuration of the uncut fruit.

The machine illustrated comprises a supporting framework designated as a whole by reference numeral 1 and made up mainly of structural steel shapes. On this framework are mounted all the constituent elements of the machine which comprise: (1) a so-called turnover-shaker-feed device designated as a whole by reference numeral 2; (2) a pair of horizontally disposed cutters 3; (3) a gang of spaced disc cutters 4; (4) a transverse cutter 5; (5) a toothed feed-wheel 6; (6) electric motors 7 and 8; and (7) suitable ancillary mechanisms which will be specifically referred to as the detailed description progresses.

Figure 2:
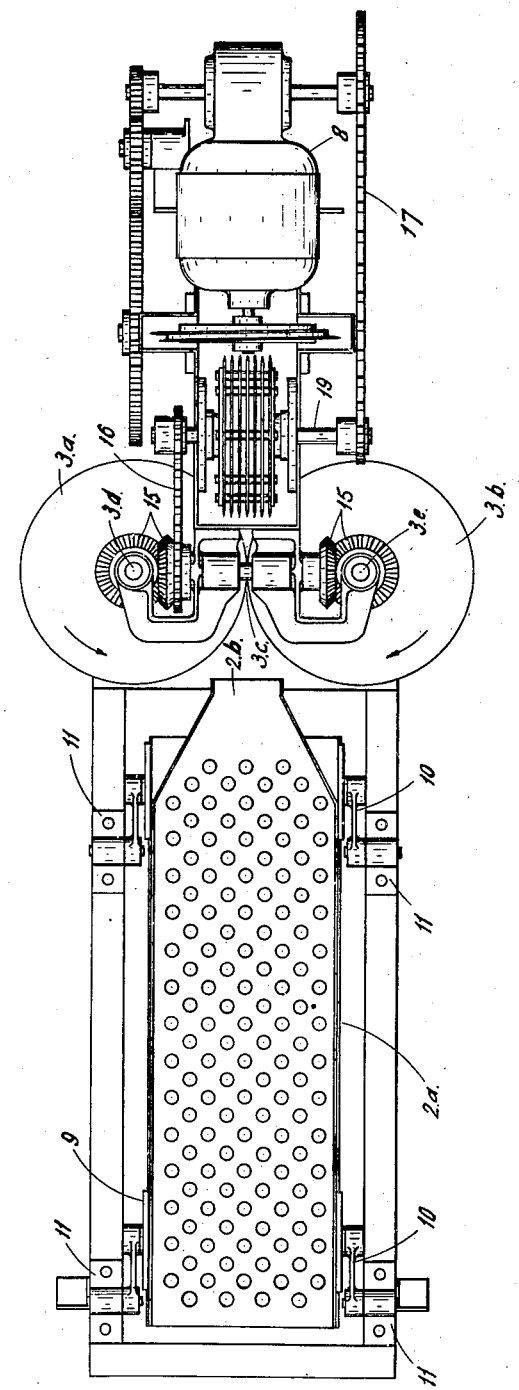
Fig. 2 is a plan view of the same machine.

The turnover-shaker-feed device 2 comprises a sheet steel trough 2a preferably lined with sheet copper and having its bottom perforated as shown in the plan view, Fig. 2. The right hand end of this trough is constricted to form a discharge spout at 2b. The trough is mounted through the medium of brackets 9 on four links 10 which are pivotally connected at 10a and 10b to brackets 9 and 11 respectively. The trough 2a is thus adapted to be oscillated in an oblique arc about the centers 10a.

The trough is connected by means of a pitman 12 to a crankshaft 13 which serves to reciprocate the pitman 12 and, in turn, to reciprocate the trough in an arcuate path about the centers 10a as previously stated. The crankshaft 13 is suitably supported in bearings mounted on the framework and is actuated by motor 7 through the medium of a driving belt 14.

The material in process, that is to say, the fruit or other material to be operated upon is deposited in the trough 2a at the left hand end. This trough being continuously in oscillation, causes the material in process to move forward toward the discharge spout 2b. At the same time the oscillatory movement of the trough functions to turn over any fruit which happens to be lying otherwise than on its flat side—the result being that all the fruit is reposing on its flat side by the time it reaches the point of discharge.

As each piece of fruit is discharged from the spout 2b it encounters a pair of horizontally disdisposed disc cutters 3a and 3b, the peripheral cutting edges of which overlap in shear-like formation at 3c. The cutters 3a and 3b have vertical axes of rotation 3d and 3e respectively and they are rotated in the directions indicated by the arrows by means of bevel driving gears 15 which are actuated by motor 8 through the medium of driving chains 16 and 17 and suitable sprocket wheels.

Just before coming into engagement with the disc cutters 3a and 3b the fruit drops from the discharge spout 2b onto a flat plate 18 which serves to support it during the first cutting operation. The distance between the top of plate 18 and the horizontal cutters 3 determines the thickness of the first cut. If, for example, it is desired to produce one-half inch cubes the dimension referred to will be one-half inch.

It will be immediately apparent from the direction of rotation of cutters 3a and 3b that the material in process presented thereto will be quickly drawn therebetween upon coming into engagement with either of those cutters and that both the lower and upper slices will be discharged with some force at the opposite side.

The first cutting operation having been performed, the next operation is to cut the slices of fruit or other material into strips. This is accomplished by the conjoint action of the gang cutter 4 and the toothed feed-wheel 6. The gang cutter, as shown, comprises seven cutting discs mounted on a shaft 19 and suitably spaced to cut the fruit into strips of the required width, as, for example, one-half inch.

The slices of fruit being discharged from the cutters 3 move by gravity along the surface of plate 18 which is arranged with a slight declivity and come into engagement with the peripheral teeth of the continuously rotating feed-wheel 6 which serves to convey the slices of fruit into engagement with the several cutting edges of the gang cutter 4. As shown in Figs. 3 and 4, the toothed feed-wheel 6 is made up of a series of toothed discs 6a to 6g inclusive, adjacent discs being spaced apart to correspond to the spacing of the cutting discs comprising the gang cutter.

As the fruit is cut into strips it drops into the spaces between the co-adjacent toothed discs and is supported, in each instance, by a stripper bar 20, of which there is one for each inter-disc space.

To avoid all possibility of the stripped fruit being carried upwardly and away from its proper path by the gang cutters there are provided an additional series of stripper bars or plates 21 which are disposed, individually, in the spaces intervening the discs of the gang cutter 4. It will be seen from an inspection of Fig. 1 that the fruit or other material having been cut into strips by the action of the gang cutter 4, will rest on the stripper bars 20 in the spaces between the toothed discs; and this is an important factor because it is essential to the success of the next operation which is the cutting of the strips into sections of uniform length. To accomplish this latter operation the fruit or other material must be supported transversely as well as vertically. The toothed discs serve to provide the necessary transverse support while the stripper bars 20 provide the vertical support.

The next operation, namely, the cutting of the strips into sections of uniform length is performed by means of a disc-type rotary knife 22 having a peripheral cutting edge of novel form which, for convenience of identification, is referred to hereinafter and in the appended claims as being spirohelical in form. The cutting edge of this knife is spiral in form in that its radius is continuously variable from one end to the other in the manner of a spiral curve and it is helical in form in that it advances in the manner of a screw thread in the direction of the axis of rotation. The extent of this advance per complete revolution which is referred to in mechanical parlance as the lead or pitch of the blade determines the length of the sections into which the strips are cut. In the instant case the cutter blade makes one complete turn.

The cutter 22 is mounted directly on the shaft of electric motor 8 and is driven thereby at high speed. The blade of this cutter is comparable to the thread of a worm in a worm and wheel mechanism and it meshes with the teeth of the feed-wheel 6 in like manner.

Feed-wheel 6 is rotatably mounted on shaft 23 and is connected through a train of gears 24, 25, 26, and 27 to the motor 8 by which it is driven in synchronism with cutter 22. It should be noted that although the cutter 22 and the feed-wheel 6 are in mesh and operate in a manner similarly to a worm and wheel mechanism, the cutter does not drive the feed-wheel.

Assuming that the fruit is to be cut into one-half inch cubes, the pitch or lead of the blade of cutter 22 is, correspondingly, one-half inch and, likewise, the pitch of the teeth of feed-wheel 6. Obviously the feed-wheel advances circumferentially at the pitch line one-half inch per revolution of the cutter 22 and it will be evident that the stripped fruit is cut into sections one-half inch in length. By virtue of the variable radius of the cutting edge of cutter 22 the transverse cutting of the fruit is effected by a slicing movement of the blade. The blade, being very sharp, a clean cut is effected without crushing or other mutilation of the fruit, even though the latter may be quite soft and fibrous in texture. It will be evident that the same condition obtains with respect to the operations of the horizontal cutters 3 and the gang cutters 4, each of which is brought into engagement with the fruit in such a manner as to produce a slicing cut.

Adverting to the stripper bars 20, it will be noticed that these are notched adjacently to the blade of cutter 22. These notches permit the cutting blade to pass completely through the strips of fruit. As illustrated in Fig. 1, the stripper bars 20 are so arranged that they will function to dislodge the sectionalized fruit from the feed-wheel after passing the transverse cutter 22. The final product is discharged by way of spout 28.

To those skilled in the art, it will be apparent that certain of the constituent features and subcombinations of the machine herein described may be usefully employed independently of the remainder. For example, if it should be desired merely to cut fruit or other material into slices, the disc cutters 3, alone, would serve that purpose. If, on the other hand, it be desired to cut the material into slices and then into strips without cutting the strips transversely, the machine could be employed without the cutter 22. If the material to be operated upon is of uniform thickness at the outset and it is desired to cut it into cubes or rectangles, the disc cutters 3 could be omitted and the remaining parts of the machine employed; in which event the gang cutter 4 would cut the material into strips and the cutter 22 would cut it transversely as previously described. Finally, if the function to be performed consists only in cutting the material transversely into pieces of uniform length or thickness, the cutters 3 and 4 may be omitted and the feed-wheel suitably designed to accommodate the width and thickness of the material to be operated upon.

It is believed that a rotary cutter having a spiro-helical cutting blade is broadly novel, per se, and likewise in combination with a feeding mechanism as well as in combination with the other major constituents of the machine herein described.

The appended claims have been drawn with a view to defining, not only the machine and its constituent novel features and sub-combinations as specifically disclosed, but, in addition, to embrace such variations and modifications as are believed to be within the purview of the inventive concept.

What is claimed is:

1. In combination, a rotary disc-type cutter having a helical cutting edge, a plurality of peripherally toothed feed-wheels in mesh with said cutting edge, said feed-wheels being mounted in side by side spaced relation to form channels therebetween for the reception of strips of material to be cut, and means for supporting said material as it is advanced between said feed-wheels.

2. In combination, a rotary cutter having a helical cutting edge, a toothed wheel in mesh with said helical cutting edge, said toothed wheel comprising a plurality of spaced peripherally toothed discs, and a stripper bar interposed in the space between said discs, said stripper bar serving as a support for material in process while said material is engaged with said rotary cutter.

3. In combination, a rotary cutter having a spiro-helical cutting edge and a peripherally toothed wheel in mesh with said spiro-helical cutting edge, said wheel comprising a gang of spaced peripherally toothed discs, said rotary cutter and wheel being operable conjointly in the manner of a worm and wheel mechanism, means for conveying material to be cut along a path extending substantially in the same general direction as the axis of rotation of said rotary cutter, said path including the area of engagement between said toothed wheel and said cutting edge.

4. A dicing machine including means for conveying material to be diced along a given path, a gang of spaced cutters situated adjacent to said path and operable to cut said material into strips, a rotary cutter having a helical cutting edge situated adjacent to said path and operable to cut said material transversely into sections of predetermined length and means forming parallel channels for the reception of said strips of material and for transversely supporting said strips while the same are engaged with said last mentioned rotary cutter.

5. The combination in a cutting machine of a gang cutter operable to cut the material in process into strips, a rotary cutter having a helical cutting edge, said last mentioned rotary cutter being operable to cut the strips of said material into sections of predetermined length, and a feed mechanism for conveying said material into engagement with said cutters consecutively, said feed mechanism including a gang of peripherally toothed discs mounted coaxially, coadjacent discs being spaced apart, the spaces between said discs being of a width corresponding to the width of said strips, said discs being adapted to provide transverse support for said strips while the same are being cut transversely by said rotary cutter, said toothed discs being in mesh with the helical cutting edge of said rotary cutter in the manner of a worm and wheel mechanism.

6. The combination in a cutting machine of a gang cutter operable to cut the material in process into strips, a rotary cutter having a helical cutting edge, said last mentioned rotary cutter being operable to cut the strips of said material into sections of predetermined length, and a feed mechanism for conveying said material into engagement with said cutters consecutively, said feed mechanism including a gang of peripherally toothed discs mounted coaxially, coadjacent discs being spaced apart, the spaces between said discs being of a width corresponding to the width of said strips, said discs being adapted to provide transverse support for said strips while the same are being cut transversely by said rotary cutter, said toothed discs being in mesh with the helical cutting edge of said rotary cutter in the manner of a worm and wheel mechanism, strippers disposed in cooperative relation to said gang cutter, said strippers being operable to guide the stripped material into the spaces between said toothed discs, and additional strippers disposed in cooperative relation to said toothed discs, said additional strippers being operable to guide the stripped material into engagement with said helical cutting edge and thereafter to remove the processed material from the spaces between said toothed discs.

7. A dicing machine comprising, in combination, a shaker-feed mechanism, a pair of rotary disc cutters having non-coaxial vertical axes of rotation, the cutting edges of said cutters being mutually adjacent in cooperative cutting arrangement, said cutters being disposed adjacent to said shaker-feed mechanism and in the path of the material in process, a rotary gang cutter having its axis of rotation extending horizontally and at right angles to the axes of rotation of said first mentioned cutters, said gang cutter being situated on the discharge side of the aforementioned pair of disc cutters, said gang cutters comprising a plurality of peripherally sharpened discs uniformly spaced apart axially, a rotary cutter situated on the discharge side of said gang cutter and having its axis of rotation extending at right angles to the axes of rotation of all the previously mentioned cutters, said rotary cutter having a spiro-helical cutting edge, and a toothed feed-wheel operable to pick up the material in process from the discharge side of the second mentioned cutters and to bring said material into engagement with said third mentioned cutter.

8. A machine for dicing halved fruit, including a shaker table for feeding and positioning the pieces of fruit on their flat sides, a runway for receiving the positioned pieces of fruit from said shaker table, a pair of circular knives mounted in cooperative cutting relation above said runway for rotation about spaced vertical axes to slice the top portions from the pieces of fruit passing over said runway, a gang of spaced circular knives mounted for rotation about a common horizontal axis extending transversely of and above the path of the fruit, a gang of peripherally serrated feed discs mounted beneath and in alignment with said gang of circular knives for receiving pieces of fruit from said runway and feeding the same into engagement with said gang of circular knives to cut the fruit into parallel strips, a spiro-helical slicing knife intermeshing with the peripheral serrations in said feed discs and mounted for rotation about an axis longitudinal to the path of the fruit, and a plurality of supporting bars extending between said feed discs for supporting the slices of fruit as they pass beneath said spiro-helical knife, said bars being uniformly spaced from the axis of said spiro-helical cutter.

9. In a machine for dicing halved fruit, the combination of a feeding and positioning means for receiving a supply of indiscriminately positioned halves of fruit and positioning them on their flat sides, means arranged to receive the positioned fruit discharged from said feeding means and direct it over a path for treatment, a pair of circular knives mounted in cooperative cutting relation above the path of the fruit for rotation about spaced vertical axes to slice the top portions from pieces of fruit passing therebeneath, a gang of spaced circular knives mounted in operative relation to the path of the fruit for rotation about a common horizontal axis to slice the fruit into parallel strips, and a spiro-helical slicing knife mounted for rotation about an axis above and longitudinally of the path of the fruit for slicing said fruit transversely.

10. In a cutting machine, a gang of spaced circular slicing knives mounted for rotation about a common horizontal axis, means for conducting material to be cut into operative engagement with said knives to slice said material into strips, means forming a series of parallel guide channels extending away from said knives and in alignment with the spaces therebetween for receiving the strips of sliced material, a slicing knife mounted for operation above said channels and arranged to slice said strips of material transversely, the walls of said channels being notched for the reception of the slicing knife mounted thereover and adapted to provide transverse support for said strips of material while the latter are being transversely cut.

11. In a cutting machine, a gang of spaced circular slicing knives mounted for rotation about a common horizontal axis, means for conducting material to be cut into operative engagement with said knives to slice said material into strips, a gang of peripherally serrated feed discs mounted to one side of said gang of circular knives and in alignment therewith whereby the strips of sliced material are directed between said feed discs, means for supporting the strips of material as they are advanced between said feed discs, and a spiro-helical slicing knife intermeshing with the serrations in said feed discs and rotatable about an axis longitudinal to the path of the material to slice said material transversely.

ALBERT R. THOMPSON.